United States Patent [19]

Viaud

[11] Patent Number: 5,121,542
[45] Date of Patent: Jun. 16, 1992

[54] CABLE WHICH IS EASILY STRIPPABLE BY A TRANSVERSELY-ACTING PINCER, AND A CABLE-STRIPPING PINCER

[75] Inventor: André Viaud, Crosne, France
[73] Assignee: Filotex, Draveil, France
[21] Appl. No.: 692,342
[22] Filed: Apr. 26, 1991

Related U.S. Application Data

[62] Division of Ser. No. 502,003, Mar. 28, 1990, Pat. No. 5,038,002.

Foreign Application Priority Data

Mar. 29, 1989 [FR] France .................. 89 04073

[51] Int. Cl.⁵ ............................................. B26B 77/00
[52] U.S. Cl. .................................... 30/90.4; 30/90.1
[58] Field of Search ............... 30/90.1, 90.4, 90.8; 81/9.43, 9.44, 9.4

[56] References Cited

U.S. PATENT DOCUMENTS 4,850,108 7/1989 Perrino et al. ............. 30/90.4

Primary Examiner—Douglas D. Watts
Attorney, Agent, or Firm—Sughrue, Mion, Zinn, Macpeak & Seas

[57] ABSTRACT

A cable which is easily strippable by a transversely-acting pincer. Its sheath has a cross-section including at least two pairs of ribs delimiting longitudinal grooves which face one another in planes intersecting the inside surface of the sheath, but outside the conductors and the earthing leads of the cable.

2 Claims, 1 Drawing Sheet

U.S. Patent June 16, 1992 5,121,542
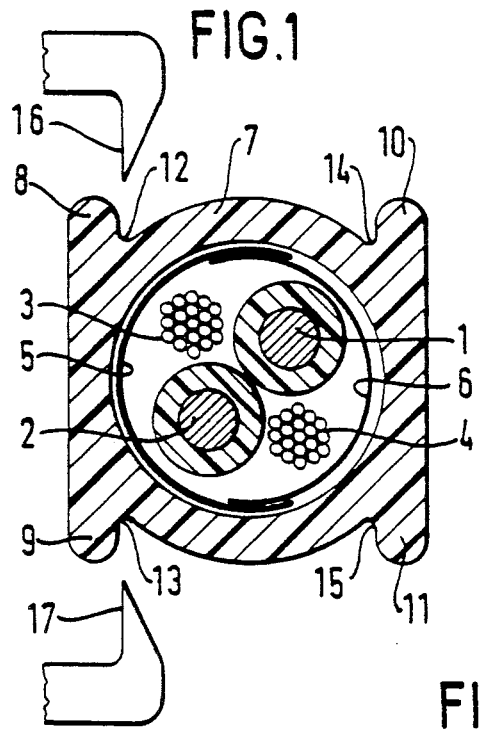
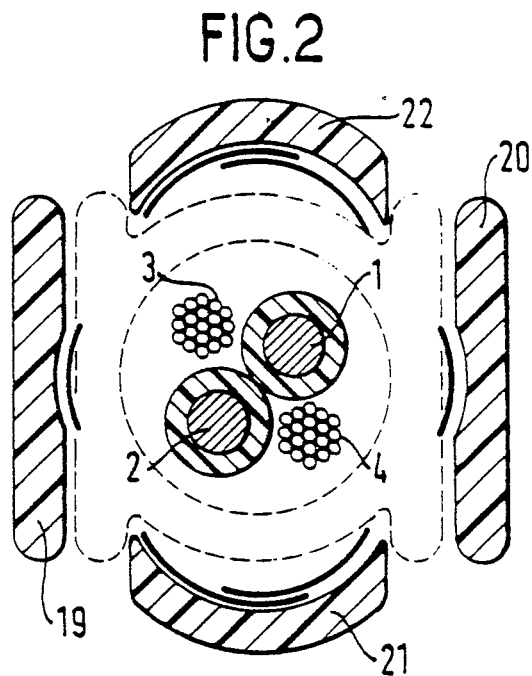
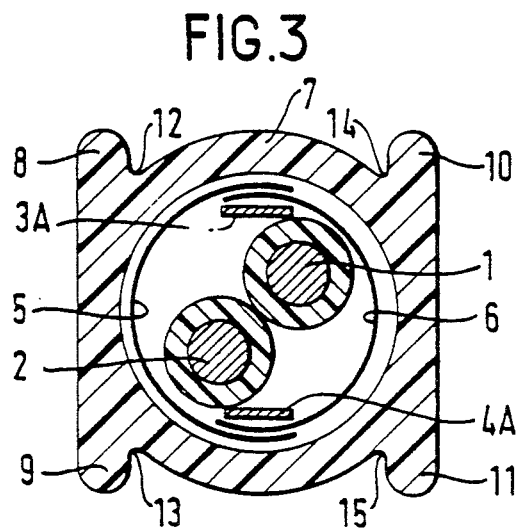
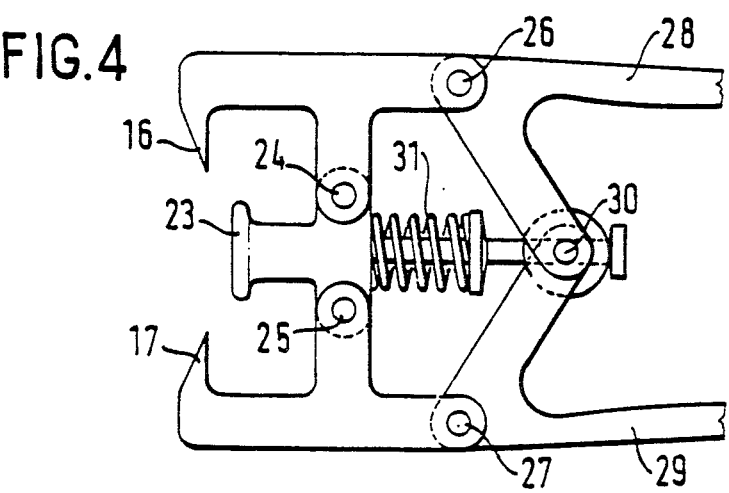

CABLE WHICH IS EASILY STRIPPABLE BY A TRANSVERSELY-ACTING PINCER, AND A CABLE-STRIPPING PINCER

This is a divisional of application Ser. No. 07/502,003 filed Mar. 28, 1990 now U.S. Pat. No. 5,038,002.

The present invention relates to a cable which is easily strippable by a transversely-acting pincer, and to a pincer specially adapted to stripping the cable.

BACKGROUND OF THE INVENTION

With certain types of cable, in particular those used for linear networks having lateral, subscriber-serving branches for signalling, surveillance, data transmission, security, etc. purposes, it is necessary to be able to modify connections frequently, either by displacing them, or else by adding new subscribers. The stripping of conventional cables using ordinary tools at arbitrary points along ordinary cable nearly always damages the conductors. Such damage gives rise to disturbance on the installed network.

The object of the present invention is to provide a cable which is easily strippable, minimizing the risk of damaging or cutting conductors therein, and making it possible to modify or add connections quickly. Another object of the invention is to provide a tool, in particular a pincer, which further increases security when stripping such a cable.

SUMMARY OF THE INVENTION

In a cable of the invention, the sheath has a cross-section including at least two pairs of ribs delimiting longitudinal grooves which face one another in planes intersecting the inside surface of the sheath, but outside the conductors and the earthing leads of the cable.

It preferably satisfies at least one of the following characteristics:

the cross-section of the sheath includes two pairs of ribs and of longitudinal grooves in parallel planes on either side of the cable axis;

the cross-section of the sheath together with its ribs can be inscribed in a square;

its earthing leads are constituted either by one or more bare multistrand or single strand conductors assembled simultaneously with the signal-carrying conductors, or else by flat strips disposed in such a manner as to avoid being intersected by the planes of the pairs of longitudinal grooves, or else by both types of earthing lead simultaneously; and the planes of the pairs of longitudinal grooves also intersect the screening of the cable.

The stripping pincer of the invention includes an abutment between its jaws for limiting the depth to which the cable penetrates between the jaws. Its jaws are preferably controlled by a system of toggle-action arms.

BRIEF DESCRIPTION OF THE DRAWING

An embodiment of the invention is described by way of example with reference to the accompanying drawing, in which:

FIG. 1 is a cross-section through a screened cable having stranded earthing leads;

FIG. 2 is a cross-section through the cable after the stripping operation;

FIG. 3 is a cross-section through a cable having earthing leads constituted by flat strips disposed outside the range of the cutting planes of the jaws of a pincer; and FIG. 4 is an elevation view of a stripping pincer controlled by a toggle mechanism and having an abutment for limiting the depth to which the cable penetrates into the pincer.

DETAILED DESCRIPTION

In FIG. 1, the cable comprises two insulated conductors 1 and 2, two earthing or grounds conductors 3 and 4, two screening tapes 5 and 6, and a sheath 7. The sheath has two pairs of longitudinal ribs 8 and 9 and 10 and 11 delimiting grooves 12 and 13 and 14 and 15 for engaging the jaws 16 and 17 of a stripping pincer. The planes of the grooves intersect the inside surface of the sheath and the screening.

After both sides of the cable have been stripped, there remain only the conductors and the earthing leads of the cable, as shown in FIG. 2, with the sheath and the screening being split into four elements 19, 20, 21, and 22.

In FIG. 3, the earthing leads 3A and 4A of the cable are in the form of flat strips which are disposed between the cutting planes (or more exactly the cutting cylinders) of a stripping pincer as defined by the grooves, thereby ensuring that there is no danger of them being damaged during stripping.

The stripping pincer shown in FIG. 4 includes an abutment 23 between jaws 16 and 17 of pivoted T-shaped members for limiting cable penetration between the jaws, thereby ensuring that only the sheath and possibly the screening is concerned by the cutting action of the pincer.

The position of the abutment is naturally fixed as a function of the thickness of the sheath and also possibly of the screening of the cable to be stripped. The jaws 16 and 17 are formed on the T-shaped members which pivot at a base thereof at a base thereof about immovable axes of pins 24 and 25, respectively. They are connected via movable pins 26 and 27 to the apexes of V-shaped control arms 28 and 29, respectively, having an end of one leg of one of the V-shaped control arms pivoted to the corresponding end of a corresponding leg of the other V-shaped control arm and pivoting about a toggle pin 30 axis offset behind the rear end of a spring 31 by sufficient clearance to allow the abutment 23 to move rearwards under stripping forces.

I claim:

1. A transversely-acting cable-stripping pincer, for stripping a cable sheath (7) having a cross-section which includes at least two pairs of ribs (8, 9, 10, 11) delimiting longitudinal grooves (12, 13, 14, 15) facing one another in planes intersecting the inside surface of the sheath but outside the conductors (1, 2) and the earthing leads (3, 4; 3A, 4A) of the cable, said pincer comprising: an abutment (23), two generally T-shaped members, each having a base and front and rear parts, said base being pivotably connected, respectively, to opposite sides of said abutment about immovable axes via pivot pins (24, 25) and centering said abutment therebetween, control arms (28, 29) respectively coupled by movable pivot pins (26, 27) to said rear part of respective T-shaped members and each having a first leg thereof, pivotally coupled together by a pin (30), said pin (30) being offset behind a rear end of a coil spring interposed between said abutment and said pin (30) such that the abutment (23) tends to move in the direction of the pin (30) in opposition to a biasing force of the interposed coil spring in response to stripping forces developed on said cable stripping pincer during stripping of said cable sheath, and wherein said abutment (23) lies between jaws (16, 17) respectively, on said T-shaped members front parts and facing opposite sides of said abutment and limiting the depth to which the cable penetrates between the jaws.

2. A pincer according to claim 1, wherein said control arms each include a second leg and are V-shaped, said movable pivot pins (26, 27) form articulations between the T-shaped members and the control arms at apexes of the V-shaped control arms, and wherein corresponding first legs of said V-shaped control arms have ends thereof pivotally connected to each other, and form a toggle linkage mechanism offset to the rear of the coil spring and having a sufficient clearance therebetween to permit the abutment (23) to move rearwardly in the direction of said spring under the forces developed during stripping of said cable sheath.

* * * * *